W. T. EASTERDAY.
Seed-Planter.

No. 207,404.    Patented Aug. 27, 1878.

Witnesses
Geo. H. Strong
Frank A. Brooks

Inventor
William T. Easterday
by Dewey & Co.
Attys

UNITED STATES PATENT OFFICE.

WILLIAM T. EASTERDAY, OF WATSONVILLE, CALIFORNIA.

IMPROVEMENT IN SEED-PLANTERS.

Specification forming part of Letters Patent No. 207,404, dated August 27, 1878; application filed June 22, 1878.

*To all whom it may concern:*

Be it known that I, WILLIAM T. EASTERDAY, of Watsonville, county of Santa Cruz, and State of California, have invented an Improved Seed-Planter; and I do hereby declare the following to be a full, clear, and exact description thereof, reference being had to the accompanying drawings.

My invention relates to certain improvements upon the seed-planter for which Letters Patent No. 180,468 were issued to me on the 1st day of August, 1876; and it consists in the following described and claimed changes, improvements, and additions, whereby the machine is simplified in construction and rendered more convenient to keep in order, while its practical utility is improved.

Figure 1:
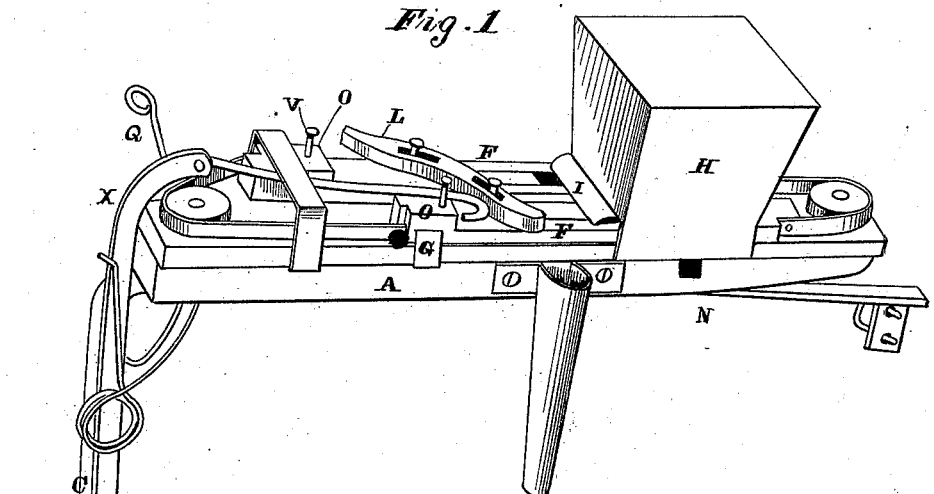
Figure 2:
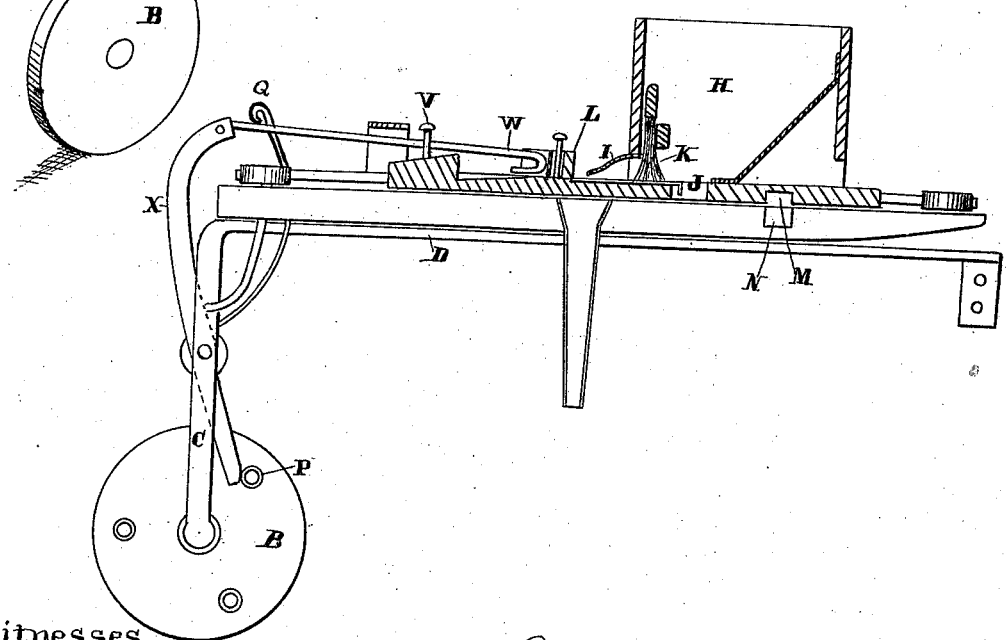

Referring to the accompanying drawings, Figure 1 is a perspective view of my seed-planter. Fig. 2 is a section of the same.

The frame, as in my former machine, consists of a single beam, A, mounted at its rear end upon a wheel, B, while its opposite or forward end is arranged to be attached to the beam of a plow. In order to elevate the rear end of the frame to a level with the forward end when it is attached to the rear beam of the plow, I connect the wheel B with the rear end of the frame by means of an upright standard, C.

D is a spring-bar, which extends along under the frame A, and projects to a short distance in front of it. The forward end of this spring-bar is attached by proper fastenings to the rear beam of the plow, thus connecting the machine with the plow without any other attachment. My object in using this spring-bar for attaching the machine to the plow is to obtain sufficient downward pressure upon the bearing-wheel B to insure its rotation. This is rendered necessary on account of the lightness of the machine and the unevenness of ordinary land over which the seed-planter is liable to be drawn. The spring-bar will exert sufficient downward pressure to give the necessary traction to the wheel.

The frame A, in the machine described in my former patent, was represented by a trough, in which the slides F F moved; but in my present machine it consists of a flat-topped beam, upon which the slides operate reciprocally side by side, being guided in a direct line partly by passing through the lower portion of the seed-box and partly by guide-plates G, as hereinafter described.

The seed-box H has its sides extended downward below the end pieces, so that when their lower edges are secured to the sides of the frame A and an opening left below the ends on top of the frame, the sliding bars F F are then extended so as to pass under the box H through these end openings, as shown, thus guiding the forward ends of the slides, as in my former machine, while the guide-plates G prevent their rear ends having any lateral motion.

A shield, I, is attached to the upper edge of the rear opening of the seed-box so as to project out a short distance over the slides F. This shield is made of thin sheet metal, and serves to prevent any of the seeds from being whipped out of the pockets J by the brush K, which prevents all but just what the pockets in the slides contain from passing out of the seed-box.

A block, O, is secured to each slide F near its rear end, and each block has a pin, V, projecting upward from it, which prevents the hooks W from being thrown out too far to one side. These blocks O serve to insure the catching of the hooks in the slides, since if they fail to engage with the recesses in the slides, they will surely do so with the blocks, which are just behind the recesses. The pins V serve as guides to the draw-hooks W, and prevent their being thrown too far to either side. The draw-hooks traverse from side to side, being guided by the changing switch-bar L, and these pins serve as stops to arrest the hook at the proper point.

The switch-bar L, instead of being a simple straight bar, as shown in my former device, is curved or made concave or bow-shaped on its rear faces, in order to more effectually direct the hook W into the groove or recess on the slides in front of the blocks O.

The slides F have each a groove, M, cut in their under side, just forward of the receiving-pockets, which groove extends forward to a slot or groove, N, in the frame or bed-piece, and which comes out of the side of the frame below the downward-projecting edges of the seed-box, as shown. These grooves serve to free the slides from dirt or dust that may happen to work in under them, as the alternating motion of the slides brings the grooves M over the grooves N, thus allowing the dust or dirt to fall out to the ground. The seeds, however, which drop into the pockets in the slides are discharged into the chamber which leads to the dropping-spout, as shown.

The hook W, which shifts the slides, is operated, as in my former machine, by a trip-lever, X, and this trip-lever is operated by pins on the side of the wheel B. To render the tripping action of the pins more efficient and prevent unnecessary friction, I place a friction-roller, P, on each pin, so that a less amount of traction is required to operate the slides.

On the rear part of the frame I place a lever, Q, which engages with the trip-lever X, which will, by being drawn forward, keep the spring operating said trip-lever extended and keep the trip-lever back, thus preventing it from engaging with the lugs and stopping the operation of the slides. This is necessary when going over ground where it is not desired to plant seed, as in going to or from a field, crossing roads, &c.

Having thus described my invention, what I claim as new, and desire to secure by Letters Patent, is—

1. The slides F F, having the blocks O O, in combination with the concave or bow-shaped switch-bar L and the reciprocating operating or draw hook W, when constructed to operate substantially as and for the purpose herein described.

2. The seed-slides F F, having the grooves M cut in their lower sides forward of the receiving-pockets, in combination with the grooves N in the frame or bed-piece, opening outward, so as to receive dirt or dust from the slides and discharge it, substantially as herein described.

3. The trip-lever X, operated by the pins upon the wheel B, said pins being provided with friction-rollers P, in combination with the lever Q, for holding back the trip-lever and stopping the operation of the machine, substantially as herein described.

In witness whereof I have hereunto set my hand and seal.

WILLIAM THOMAS EASTERDAY. [L. S.]

Witnesses:
GEO. PACE,
W. M. BAILEY.